US007923706B2

(12) United States Patent
Brassell et al.

(10) Patent No.: US 7,923,706 B2
(45) Date of Patent: Apr. 12, 2011

(54) ULTRAVIOLET CURING APPARATUS FOR CONTINUOUS MATERIAL

(75) Inventors: Robert Brassell, Avon, OH (US); Edward C. McGhee, Amherst, OH (US); James W. Schmitkons, Lorain, OH (US)

(73) Assignee: Nordson Corporation, Westlake, OH (US)

( * ) Notice: Subject to any disclaimer, the term of this patent is extended or adjusted under 35 U.S.C. 154(b) by 124 days.

(21) Appl. No.: 12/245,282

(22) Filed: Oct. 3, 2008

(65) Prior Publication Data

US 2010/0084574 A1 Apr. 8, 2010

(51) Int. Cl.
*A61N 5/06* (2006.01)

(52) U.S. Cl. ............ 250/504 R; 250/493.1; 250/496.1; 250/503.1

(58) Field of Classification Search .................. None
See application file for complete search history.

(56) References Cited

U.S. PATENT DOCUMENTS

| 3,911,318 | A | * | 10/1975 | Spero et al. ............ 315/39 |
| 4,710,638 | A | | 12/1987 | Wood |
| 5,117,312 | A | | 5/1992 | Dolan |
| 5,294,260 | A | | 3/1994 | Larsen-Moss et al. |
| 5,722,761 | A | | 3/1998 | Knight |
| 6,242,717 | B1 | | 6/2001 | Sanderson |
| 6,345,149 | B1 | | 2/2002 | Ervin et al. |
| 6,511,715 | B2 | | 1/2003 | Rhoades |
| 6,544,334 | B1 | * | 4/2003 | Potyrailo et al. .......... 506/32 |
| 6,559,460 | B1 | * | 5/2003 | Keogh et al. ......... 250/492.1 |
| 6,614,028 | B1 | | 9/2003 | Cekic et al. |
| 6,626,561 | B2 | | 9/2003 | Carter et al. |
| 6,657,206 | B2 | * | 12/2003 | Keogh et al. ......... 250/492.1 |
| 6,759,664 | B2 | * | 7/2004 | Thompson et al. ...... 250/492.1 |
| 2002/0050575 | A1 | * | 5/2002 | Keogh et al. ............ 250/504 R |
| 2004/0061079 | A1 | * | 4/2004 | Thompson et al. ...... 250/492.22 |

FOREIGN PATENT DOCUMENTS

| EP | 0660148 A1 | 6/1995 |
| GB | 2168230 A | 6/1986 |
| JP | 55152567 A | 11/1980 |
| JP | 5254894 A | 10/1993 |
| WO | 94/23243 A1 | 10/1994 |
| WO | 00/30411 A1 | 5/2000 |

OTHER PUBLICATIONS

European Patent Office, International Search Report and Written Opinion in PCT Serial No. PCT/US2009/059212, Nov. 26, 2010.

* cited by examiner

*Primary Examiner* — Bernard E Souw
*Assistant Examiner* — Andrew Smyth
(74) *Attorney, Agent, or Firm* — Wood, Herron & Evans, L.L.P.

(57) ABSTRACT

An ultraviolet radiation curing system is disclosed for treating a substrate, such as fiber optic cable or silicone tubing. The system comprises a processing chamber allowing transport of a continuous piece of substrate to be treated. As the substrate moves through the processing chamber, ultraviolet radiation from a plasma lamp activated by a microwave generator treats the surface of the substrate. The system comprises two elliptical reflectors of different sizes so that larger diameter substrates may be efficiently treated with ultraviolet radiation. The system may also comprise an ultraviolet-transmissive conduit enclosing the substrate and split into a first portion and a second portion, where the second portion is movable from the first portion to open the conduit and allow insertion or alignment of the substrate within the conduit and processing chamber.

4 Claims, 3 Drawing Sheets

_US 7,923,706 B2_

ULTRAVIOLET CURING APPARATUS FOR CONTINUOUS MATERIAL

TECHNICAL FIELD

The present invention relates generally to ultraviolet lamp systems, and more particularly, to microwave-excited ultraviolet lamp systems configured to irradiate a substrate with ultraviolet radiation.

BACKGROUND

Ultraviolet lamp systems are commonly used for heating and curing materials including adhesives, sealants, inks, and coatings, as well as optical cables and tubing. Certain ultraviolet lamp systems have electrodeless light sources and operate by exciting an electrodeless plasma lamp in a processing chamber with radiofrequency energy, such as microwave energy. In an electrodeless ultraviolet lamp system that relies upon excitation with radiofrequency energy, the plasma lamp emits a characteristic spectrum isotropically outward along its cylindrical length. Part of the emitted radiation moves directly from the plasma lamp toward a substrate located in the processing chamber. A substantial portion of the emitted radiation must be reflected before reaching the substrate. To efficiently use the ultraviolet radiation emitted by the plasma lamp, various designs of reflectors have been mounted in processing chambers to surround the plasma lamp and the substrate.

While conventional reflectors include rectangular box-shaped reflectors and parabolic reflectors, the most efficient reflector system is an elliptical reflector. By placing the plasma lamp along one focus of the elliptical reflector and the substrate at the other focus of the elliptical reflector, all radiation emitted by the plasma lamp reaches the substrate after no more than one reflection. Examples of these conventional systems with elliptical reflectors include U.S. Pat. No. 4,710,638 issued to Wood and U.S. Pat. No. 6,626,561 issued to Carter, et al. One challenge of conventional systems is that the efficiency of irradiation decreases as the diameter of the substrate increases because the substrate moves away from the focal axis. Therefore, the use of a completely elliptical reflector limits the diameter of the substrate being treated. Another shortcoming of conventional systems is that the substrate is often enclosed within a quartz or other ultraviolet-transmissive conduit to protect the substrate or a coating applied to the substrate from contamination. The substrate should not contact this ultraviolet-transmissive conduit, making threading the substrate through the processing chamber difficult.

It would be desirable to provide an efficient curing system with reflectors that allow for generally efficient irradiation of elongate, continuous substrates having a wide range of diameters. It would also be desirable to provide a curing system that eases the process of loading such substrates into the processing chamber.

SUMMARY OF THE INVENTION

An ultraviolet radiation curing system is provided for treating a substrate having a longitudinal axis. The curing system includes a processing chamber having an inlet port and an outlet port to transport the substrate, a plasma lamp mounted within the processing chamber, and a microwave generator coupled to the processing chamber for exciting the plasma lamp to emit ultraviolet radiation. The curing system also includes an ultraviolet-transmissive conduit positioned within the processing space. The curing system further includes a first elliptical reflector defined by a first "a" distance, a first "b" distance, a first focal line collinear with the plasma lamp, and a second focal line collinear with the longitudinal axis of the substrate. Additionally, the curing system includes a second elliptical reflector defined by a second "a" distance larger than the first "a" distance, a second "b" distance larger than the first "b" distance, a third focal line collinear with the longitudinal axis of the substrate, and a fourth focal line collinear with the plasma lamp. The plasma lamp of the curing system emits a first portion of ultraviolet radiation, which directly irradiates the substrate, a second portion of ultraviolet radiation that is reflected by the first reflector before irradiating the substrate, and a third portion of ultraviolet radiation that is reflected by the second reflector before irradiating the substrate.

In an alternative embodiment, the curing system of the invention includes a processing chamber, a plasma lamp, and a microwave generator as explained above. This curing system further includes first and second reflectors for reflecting ultraviolet radiation to irradiate the substrate. The curing system also includes an ultraviolet-transmissive conduit for enclosing the substrate, positioned within the processing chamber, and comprising a first portion and a second portion movable relative to the first portion between an open position and a closed position. The open position of the ultraviolet-transmissive conduit allows for the substrate to be loaded into the conduit.

BRIEF DESCRIPTION OF THE DRAWINGS

The accompanying drawings, which are incorporated in and constitute a part of this specification, illustrate embodiments of the invention and, together with a general description given above and the detailed description given below, serve to explain various aspects of the invention.

DETAILED DESCRIPTION

Although the invention will be described next in connection with certain embodiments, the invention is not limited to practice in any one specific type of ultraviolet curing system. The description of the embodiments of the invention is intended to cover all alternatives, modifications, and equivalent arrangements, as may be included within the spirit and scope of the invention, as defined by the appended claims. In particular, those skilled in the art will recognize that the components of the embodiments of the invention described herein could be arranged in multiple different ways.

Figure 1:
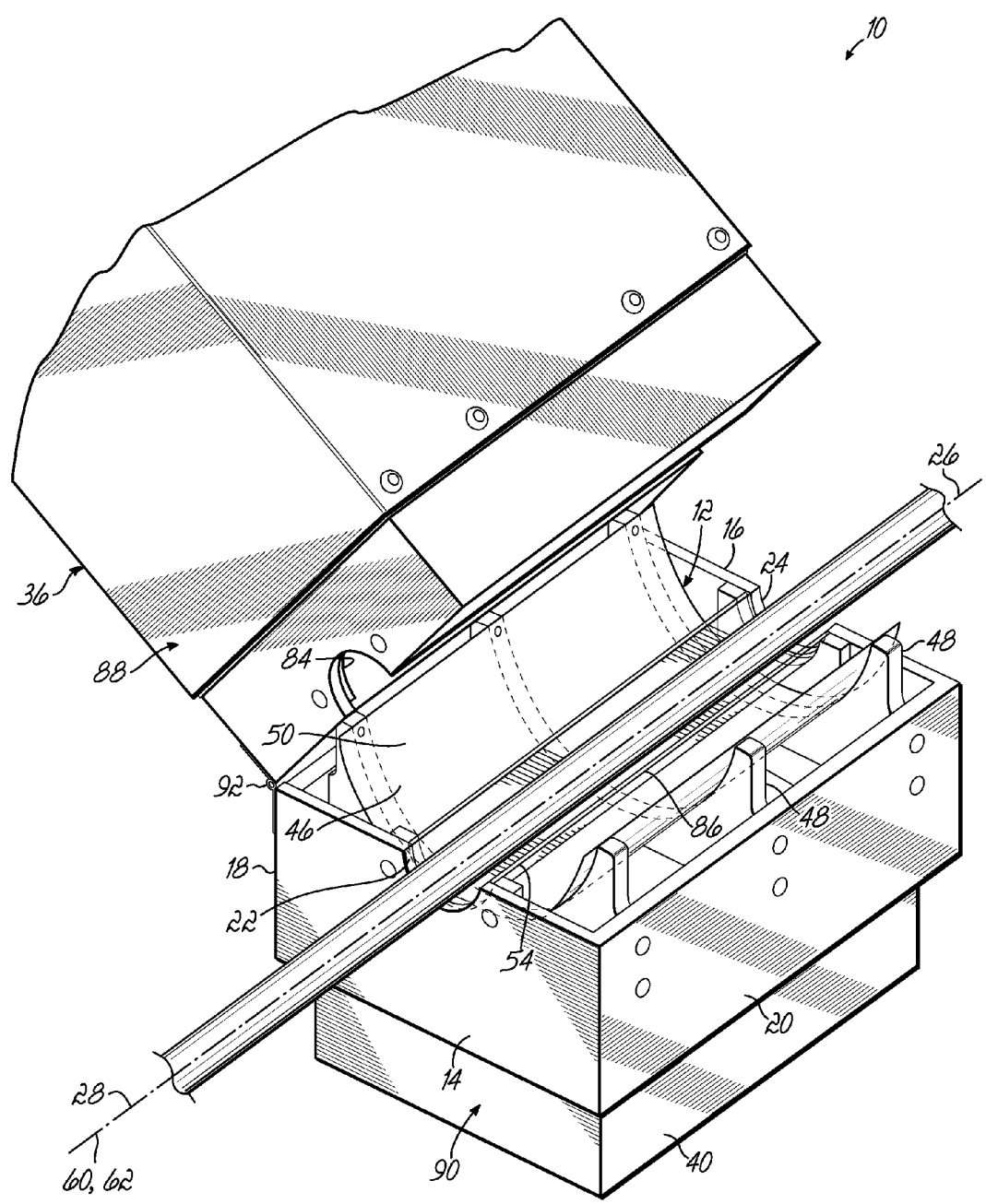
FIG. 1 is a perspective view of an ultraviolet radiation curing system in accordance with one embodiment of the invention with the processing chamber opened for insertion or alignment of a substrate.
Figure 2:
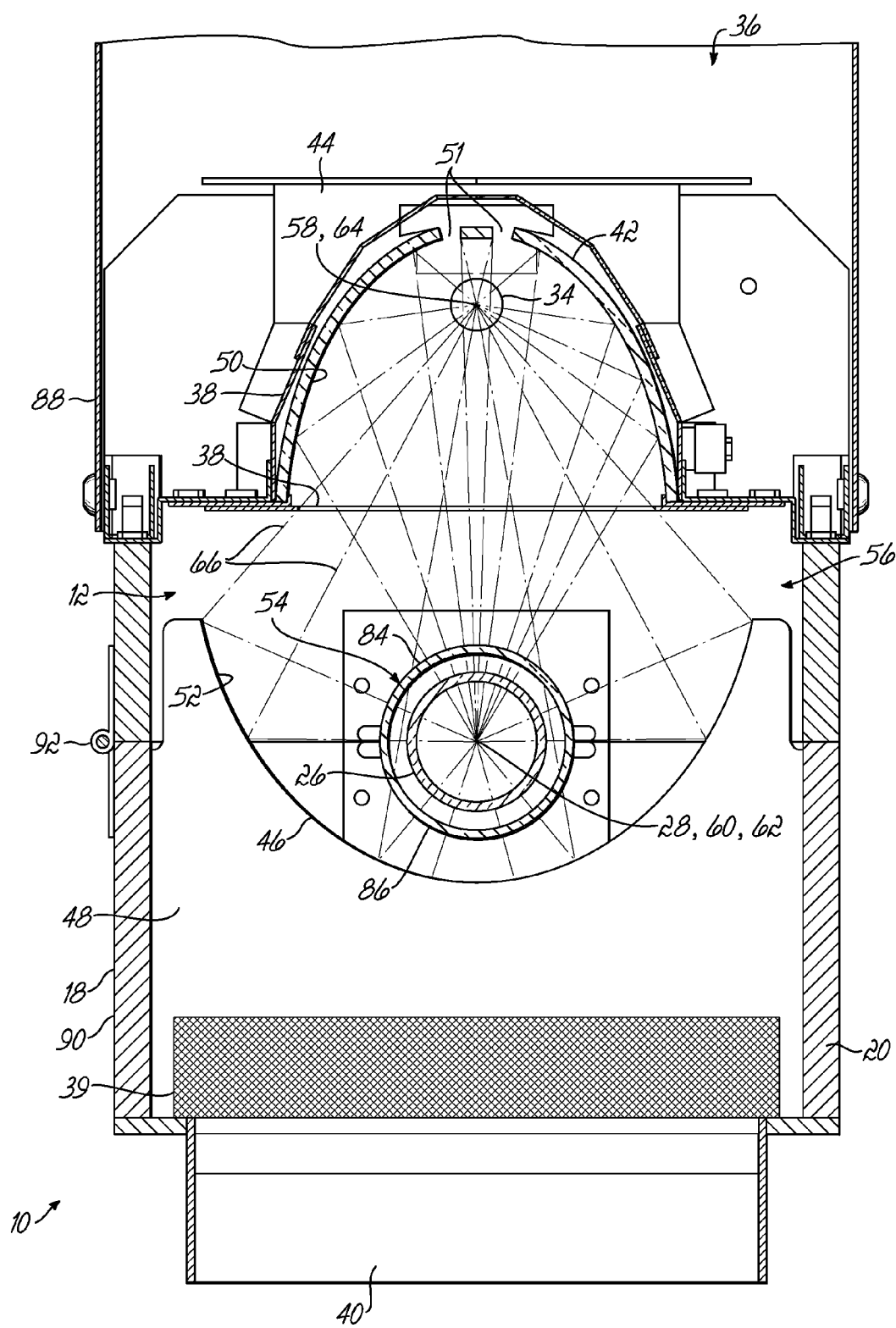
FIG. 2 is a cross-sectional view of the ultraviolet radiation curing system of FIG. 1.

Referring now to the drawings, and specifically FIGS. 1 and 2, one embodiment of an ultraviolet radiation curing system 10 is provided. The curing system 10 includes a processing chamber 12 defined by front wall 14, back wall 16, and longitudinal side walls 18, 20. An inlet port 22 located in the front wall 14 is adapted to receive a substrate 26 for ultraviolet curing. An outlet port 24 located in the back wall 16 is adapted to permit the substrate 26 to exit the processing chamber 12. The substrate 26 has a longitudinal axis 28, and the substrate 26 travels through the curing system 10 continuously along the longitudinal axis 28.

The curing system 10 also includes a plasma lamp 34, positioned longitudinally within the processing chamber 12. The ends of the plasma lamp 34 are attached in a conventional manner to the front wall 14 and the back wall 16. Plasma lamp 34 comprises a hermetically sealed, longitudinally-extending envelope or tube filled with a gas mixture. Plasma lamp 34 does not require either electrical connections or electrodes for its operation. The plasma lamp 34 is formed of an ultraviolet-transmissive material that is an electrical insulator, such as vitreous silica or quartz, so that the plasma lamp 34 is electrically isolated from other structures in the processing chamber 12. The curing system 10 includes at least one microwave generator 36 mounted above the processing chamber 12. When activated, the microwave generator 36 sends microwave energy into the processing chamber 12 through a microwave inlet (not shown) as understood by one skilled in the art. The microwave energy is substantially captured within a mesh screen box 38 surrounding the plasma lamp 34, and the mesh screen box 38 allows air to freely flow while reflecting most of the microwave energy delivered into the processing chamber 12.

Microwave energy provided by the microwave generator 36 excites atoms in the gas mixture within plasma lamp 34 to initiate and, thereafter, sustain the plasma within. A starter bulb (not shown) is provided to assist in initiating a plasma within plasma lamp 34 as understood by those of ordinary skill in the art. By adjusting the shape of processing chamber 12 and the power level of the microwave generator 36, the density distribution of the microwave energy is selected to excite atoms in the gas mixture along the entire longitudinal length of plasma lamp 34. Once the plasma is initiated, the intensity of the radiation output by the plasma lamp 34 depends upon the microwave power provided to the processing chamber 12 by microwave generator 36.

The gas mixture inside plasma lamp 34 has an elemental composition selected to produce photons having a predetermined distribution of wavelengths of radiation when the gas atoms are excited to a plasma state. For ultraviolet treating applications, the gas mixture may comprise a mercury vapor and an inert gas, such as argon, and may include trace amounts of one or more elements such as iron, gallium, or indium. The mercury vapor is provided by the vaporization of a small quantity of mercury that is solid at room temperature. The spectrum of radiation output by a plasma excited from such a gas mixture includes highly intense ultraviolet and infrared spectral components. As used herein, radiation is defined as photons having wavelengths ranging between about 200 nm to about 2000 nm, ultraviolet radiation is defined as photons having wavelengths ranging between about 200 nm to about 400 nm, and infrared radiation is defined as photons having wavelengths ranging between about 750 nm to about 2000 nm.

The curing system 10 also includes a longitudinally-extending ultraviolet-transmissive conduit 54 attached to the front wall 14 and the back wall 16 of the processing chamber 12. The ultraviolet-transmissive conduit 54 is aligned with the inlet port 22 and the outlet port 24. The conduit 54 encloses the substrate 26 during the longitudinal transfer of the substrate 26 through the processing space 12. The conduit 54 is formed of an insulating material that is highly transmissive of ultraviolet radiation, such as quartz or a vitreous silica. The conduit 54 prevents extraneous forces from acting on substrate 26, such as forced cooling air currents that may force the substrate 26 to undesirably contact the conduit 54 or contaminate the substrate 26 with dust or other particles in the processing chamber 12. This isolation ability is particularly important if the substrate 26 is fragile or otherwise prone to damage.

The curing system 10 further comprises a longitudinally-extending first reflector 42 coupled to a plurality of support ribs 44 attached in a conventional way to the processing chamber 12. The first reflector 42 is oriented toward the plasma lamp 34. The curing system 10 also comprises a longitudinally-extending second reflector 46 coupled to a plurality of support ribs 48 attached in a conventional way to the processing chamber 12. The second reflector 46 is oriented towards the first reflector 42 and the substrate 26. The first reflector 42 has an elliptical first reflective surface 50, and the second reflector 46 has an elliptical second reflective surface 52. The first reflector 42 and second reflector 46 are spaced apart from each other to allow a longitudinal gap 56 along the processing chamber 12.

A pressurized air supply (not shown) delivers air into the processing chamber 12 through gaps 51 located in the first reflector 42 to blow directly on the plasma lamp 34 and regulate the temperature of the plasma lamp 34. The forced air flows through the mesh screen box 38, around the second reflector 46 through longitudinal gap 56, and exits out an exhaust outlet 40 located at the bottom of the system 10. A light-blocking material 39 covers the exhaust outlet 40 to allow forced air through while blocking a substantial portion of ultraviolet and other light radiation from exiting the system 10.

Figure 3:
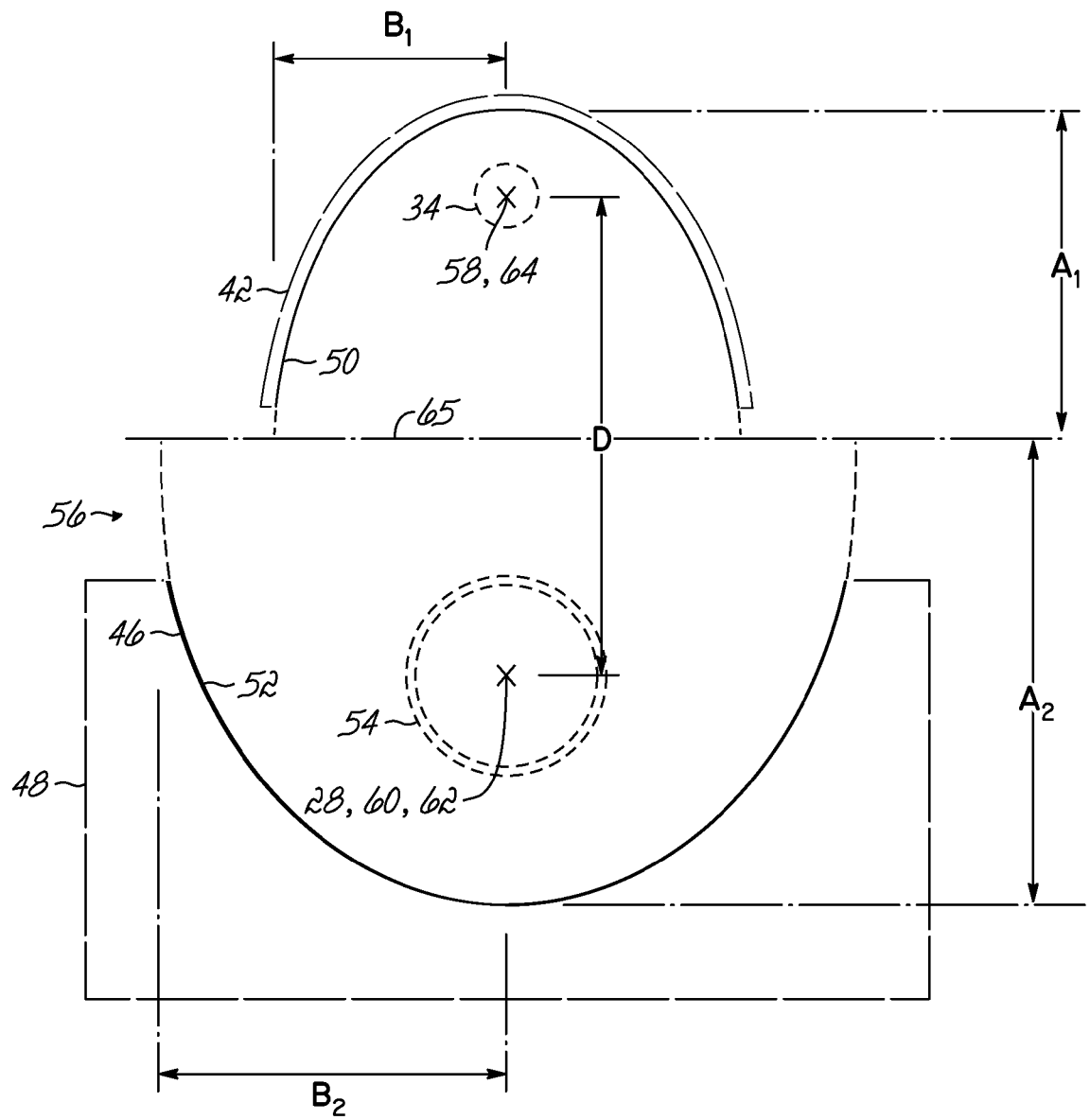
FIG. 3 is an illustration of the geometry of the elliptical reflectors in the ultraviolet radiation curing system of FIG. 1.

As best illustrated in FIG. 3, the geometric arrangement of one embodiment of the first reflector 42 and the second reflector 46 is provided. The first reflector 42 and second reflector 46 are shown solid in FIG. 3, The first reflective surface 50 is a partial ellipse defined by a first "a" distance $A_1$ and a first "b" distance $B_1$ as well understood in the art. The first reflective surface 50 is further defined by a first focal line 58 and a second focal line 60 each extending longitudinally along the first reflector surface 50. These first and second focal lines 58, 60 are separated by a distance D, defined by the following formula:

$$D=(2)(C), \text{ where } C^2=A^2-B^2$$

Similarly, the second reflective surface 52 is a partial ellipse defined by a second "a" distance $A_2$ which is larger than the first "a" distance $A_1$, and a second "b" distance $B_2$ which is larger than the first "b" distance $B_1$. The second reflective surface 52 is also defined by a third focal line 62 substantially collinear with the second focal line 60, and a fourth focal line 64 substantially collinear with the first focal line 58. The second reflective surface 52 consequently shares a distance D between focal lines 62, 64 with the first reflective surface 50, allowing the second reflective surface 52 to be a larger ellipse than the first reflective surface 50. Note that in FIG. 3, the partial ellipses made by the first reflective surface 50 and the second reflective surface 52 are extended in phantom into half-ellipses in order to clearly show each "a" distance relative to the centerline 65 representing one-half of distance D and each "b" distance relative to the focal lines 58, 64 and 60, 62.

As an example of an acceptable size for the first reflective surface 50 and the second reflective surface 52 in this embodiment: the $A_1$ distance is 3.74 inches, the $B_1$ distance is 2.97 inches, and the D distance between foci is calculated to be 4.56 inches, using the above formula. Now given any $A_2$ distance, an appropriate $B_2$ distance can be calculated using the D distance. Continuing the example, the $A_2$ distance is set at 4.57 inches, so the $B_2$ distance is therefore 3.97 inches. This aspect of the curing system 10 is not limited to the foregoing example of reflector sizes, as this is one specific known set of reflector sizes, shown for illustration purposes only.

The first reflector 42 and second reflector 46 are preferably formed of a radiation-transmissive material that reflects ultraviolet radiation and transmits other kinds of radiation such as infrared and microwave radiation. An example of such a material is a borosilicate glass, such as Pyrex® glass made by the Corning Corporation in Corning, N.Y. Alternatively, the first reflector 42 and second reflector 46 can be formed with any material having suitable reflective and transmissive properties for ultraviolet curing. The preferential transmission and reflection of radiofrequency energy can also be provided by applying a dichroic coating to the first reflector 42 and the second reflector 46 as well understood by those skilled in the art.

The first reflector 42 and second reflector 46 are placed so that the plasma lamp 34 is located substantially on the first focal line 58 and fourth focal line 64, while the longitudinal axis 28 of the substrate 26 is substantially collinear with the second focal line 60 and the third focal line 62. As best shown in FIG. 2, ultraviolet radiation is delivered from the plasma lamp 34 located at the first focal line 58 to the substrate 26 at the second focal line 60 directly or after at least one reflection off the first reflector 42 or the second reflector 46. Advantageously, the second reflector 46 being larger than the first reflector 42 allows for a larger ultraviolet-transmissive conduit 54 and therefore, a larger diameter substrate 26 to be treated by the curing system 10. For example, the curing system 10 illustrated by this embodiment can treat a substrate 26 as small as a fiber optic cable or as large as silicone tubing. The treatment process is used to cure the substrate 26 material itself or a coating applied to the substrate 26 that is sensitive to ultraviolet radiation. As illustrated by arrows 66 in FIG. 2, the ultraviolet irradiation is substantially efficient on the substrate 26 thanks to the longitudinal axis 28 being located at one focal line 60, 62 of each reflector 42, 46.

The plasma lamp 34 emits a first portion, second portion, and third portion of ultraviolet radiation. As best shown in FIG. 2, the first portion of ultraviolet radiation directly irradiates the substrate 26 without reflection. The first reflector 42 reflects the second portion of ultraviolet radiation emitted by the plasma lamp 34, while the second reflector 46 reflects the third portion of ultraviolet radiation emitted by the plasma lamp 34. Consequently, the ultraviolet radiation is delivered to treat the substrate 26 in an efficient manner on all sides of the substrate 26 upon release from the plasma lamp 34.

Another aspect of a curing system 10 is provided as shown in FIGS. 1-2 and described below. In this aspect, the ultraviolet-transmissive conduit 54 is split into a first portion 84 and a second portion 86 movable relative to the first portion 84 between an open position illustrated in FIG. 1 and a closed position illustrated in FIG. 2. The open position allows the substrate 26 to be loaded into or aligned properly within the ultraviolet-transmissive conduit 54.

In this aspect, the processing chamber 12 further comprises a first portion 88 and a second portion 90 movably connected by a hinge 92 or other conventional methods to the first portion 88. The first portion 88 of the processing chamber 12 includes the first reflector 42 and the first portion 84 of the ultraviolet-transmissive conduit 54. The second portion 90 of the processing chamber 12 includes the second reflector 46 and the second portion 86 of the ultraviolet-transmissive conduit 54. The first portion 88 and second portion 90 of the processing chamber 12 move from an open position shown in FIG. 1 to a closed position shown in FIG. 2. The open position allows for loading and alignment of a substrate 26 in the processing chamber 12 while the closed position allows for operation of the curing system 10 to treat the substrate 26. The features of this aspect may be combined with the above-described features of the embodiment, or these features may exist separately in the curing system 10.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is not limited to the specific details, representative apparatus, or illustrative examples shown and described. Accordingly, departures may be made from such details without departing from the spirit or scope of the applicants' general inventive concept.

What is claimed is:

1. An ultraviolet radiation curing system for treating a substrate having a longitudinal axis, comprising:
   a processing chamber having an inlet port capable of receiving the substrate for positioning in said processing chamber and an outlet port capable of permitting the substrate to exit said processing chamber;
   a longitudinally-extending plasma lamp mounted within said processing chamber and capable of emitting ultraviolet radiation;
   a microwave generator coupled to said processing chamber for exciting said plasma lamp to emit ultraviolet radiation, a first portion of said ultraviolet radiation directly irradiating the substrate without reflection;
   a longitudinally-extending ultraviolet-transmissive conduit positioned within said processing chamber and enclosing the substrate when the substrate is positioned within said processing chamber;
   a longitudinally-extending first reflector mounted within said processing chamber, said first reflector having an elliptical first reflective surface defined by a first "a" distance, a first "b" distance, a first focal line substantially collinear with said plasma lamp, and a second focal line substantially collinear with the longitudinal axis of the substrate, said first reflective surface oriented relative to said plasma lamp for reflecting a second portion of said ultraviolet radiation to irradiate the substrate; and
   a longitudinally-extending second reflector mounted within said processing chamber, said second reflector having an elliptical second reflective surface defined by a second "a" distance larger than said first "a" distance, a second "b" distance larger than said first "b" distance, a third focal line substantially collinear with the longitudinal axis of the substrate, and a fourth focal line substantially collinear with said plasma lamp, said second reflective surface oriented relative to said plasma lamp for reflecting a third portion of said ultraviolet radiation to irradiate the substrate.

2. The ultraviolet radiation curing system of claim 1, wherein said first reflector is spaced from said second reflector, creating a longitudinally-extending gap to allow air flow through the processing chamber to regulate the temperature of said plasma lamp.

3. The ultraviolet radiation curing system of claim 1, wherein said ultraviolet-transmissive conduit comprises a first portion and a second portion movable relative to said first portion between open and closed positions, said open position allowing the substrate to be loaded into said ultraviolet-transmissive conduit.

4. The ultraviolet radiation curing system of claim 3, wherein said processing chamber further comprises:
 a first portion including said first reflector, said first portion of said ultraviolet-transmissive conduit, and said plasma lamp; and
 a second portion including said second reflector and said second portion of said ultraviolet-transmissive conduit, said second portion connected to said first portion so that said processing chamber and said ultraviolet-transmissive conduit can be opened for insertion or alignment of the substrate.

* * * * *